US012732869B2

(12) United States Patent
Ping et al.

(10) Patent No.: US 12,732,869 B2
(45) Date of Patent: Sep. 8, 2026

(54) FULFILLMENT OF SERVICE REQUIREMENTS

(71) Applicant: Nokia Solutions and Networks Oy, Espoo (FI)

(72) Inventors: Jing Ping, Chengdu (CN); Konstantinos Samdanis, Munich (DE); Anatoly Andrianov, Naperville, IL (US); Jürgen Goerge, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 439 days.

(21) Appl. No.: 18/261,369

(22) PCT Filed: Jan. 15, 2021

(86) PCT No.: PCT/CN2021/072311
§ 371 (c)(1),
(2) Date: Jul. 13, 2023

(87) PCT Pub. No.: WO2022/151426
PCT Pub. Date: Jul. 21, 2022

(65) Prior Publication Data

US 2024/0306042 A1 Sep. 12, 2024

(51) Int. Cl.
*H04W 28/24* (2009.01)
*H04W 60/04* (2009.01)
*H04W 64/00* (2009.01)

(52) U.S. Cl.
CPC .......... *H04W 28/24* (2013.01); *H04W 60/04* (2013.01); *H04W 64/006* (2013.01)

(58) Field of Classification Search
CPC ... H04W 28/24; H04W 60/04; H04W 64/006; H04W 48/18; H04W 60/00; H04W 24/02
See application file for complete search history.

(56) References Cited

U.S. PATENT DOCUMENTS

| | | | | |
|---|---|---|---|---|
| 2011/0110300 A1* | 5/2011 | Sachs | .................... | H04W 48/18 370/328 |
| 2019/0150081 A1* | 5/2019 | Qiao | .................... | H04W 48/18 370/329 |

(Continued)

FOREIGN PATENT DOCUMENTS

| | | |
|---|---|---|
| WO | 2008/151830 A1 | 12/2008 |
| WO | 2020/033424 A1 | 2/2020 |

(Continued)

OTHER PUBLICATIONS

De Baas, Anne, et al. "Review and alignment of domain-level ontologies for materials science." IEEE Access 11 (2023): 120372-120401. (Year: 2023).*

(Continued)

*Primary Examiner* — Sharad Rampuria
(74) *Attorney, Agent, or Firm* — Nokia Solutions and Networks Oy

(57) ABSTRACT

Example embodiments of the present disclosure relate to devices, methods, apparatuses and computer readable storage media for fulfillment of service requirements. In a method at a service provider, knowledge about a plurality of network and management domains is collected, and service requirements from a service consumer are determined. Based on the service requirements from the service consumer and the collected knowledge about the plurality of network and management domains, a set of access network domains is selected from a plurality of access network domains to provide a service area for the service consumer. At an access domain, mapping of at least a part service area to tracking areas is determined to fulfill the service requirements from the service consumer. Thus, the service provision for a service consumer may consider network charac- (Continued)

teristics such as mobility, load, performance, configurations, topology or the like, which is more efficient.

18 Claims, 8 Drawing Sheets

(56) References Cited

U.S. PATENT DOCUMENTS

| | | | | |
|---|---|---|---|---|
| 2021/0112460 | A1* | 4/2021 | Fujishiro | H04W 48/18 |
| 2021/0144530 | A1* | 5/2021 | Zhang | H04L 9/50 |
| 2023/0189187 | A1* | 6/2023 | Velev | H04W 48/16<br>455/435.1 |

FOREIGN PATENT DOCUMENTS

| | | | |
|---|---|---|---|
| WO | 2020/049181 | A1 | 3/2020 |
| WO | 2020/069758 | A1 | 4/2020 |
| WO | 2020/173300 | A1 | 9/2020 |
| WO | 2021/023388 | A1 | 2/2021 |

OTHER PUBLICATIONS

Awan, Kamran Ahmad, et al. "Holitrust—a holistic cross-domain trust management mechanism for service-centric Internet of Things." Ieee Access 7 (2019): 52191-52201. (Year: 2019).*

Extended European Search Report received for corresponding European Patent Application No. 21918630.1, dated Sep. 11, 2024, 9 pages.

"3rd Generation Partnership Project; Technical Specification Group Services and System Aspects; Management and orchestration; 5G performance measurements (Release 16)", 3GPP TS 28.552, V16.6.0, Jul. 2020, pp. 1-193.

"3rd Generation Partnership Project; Technical Specification Group Services and System Aspects; Management and orchestration; Provisioning; (Release 16)", 3GPP TS 28.531, V16.6.0, Jul. 2020, pp. 1-72.

"3rd Generation Partnership Project; Technical Specification Group Services and SystemAspects; Management and orchestration; 5G Network Resource Model (NRM); Stage 2 and stage 3 (Release 17)", 3GPP TS 28.541, V17.0.0, Sep. 2020, pp. 1-446.

"Generic Network Slice Template", GSM Association, Document NG.116, Version 3.0, May 22, 2020, pp. 1-64.

Woo Kang et al., "Configuration of Tracking Area Code (TAC) for Paging Optimization in Mobile Communication Systems", Ubiquitous Information Technologies and Applications, vol. 280, 2014, pp. 59-66.

"3rd Generation Partnership Project; Technical Specification Group Services and System Aspects; System architecture for the 5G System (5GS); Stage 2 (Release 16)", 3GPP TS 23.501, V16.5.1, Aug. 2020, pp. 1-440.

"3rd Generation Partnership Project; Technical Specification Group Services and System Aspects;Management and orchestration; 5G end to end Key Performance Indicators (KPI) (Release 16)", 3GPP TS 28.554, V16.5.0, Jul. 2020, pp. 1-31.

International Search Report and Written Opinion received for corresponding Patent Cooperation Treaty Application No. PCT/CN2021/072311, dated Oct. 12, 2021, 9 pages.

"3rd Generation Partnership Project; Technical Specification Group Services and System Aspects; Management and orchestration; Study on enhancement of Management Data Analytics (MDA) (Release 17)", 3GPP TR 28.809, V1.1.0, Nov. 2020, pp. 1-93.

"Add the use cases related to SLA assurance", 3GPP TSG-SA5 Meeting #129e, S5-201492, Agenda: 6.6.4, Huawei, Feb. 24-Mar. 4, 2020, 3 pages.

"MDAS assisted slice resource allocation contributing to SLS assurance", 3GPP TSG-SA5 Meeting #127, S5-196268, Agenda: 6.4.10, Huawei, Oct. 14-18, 2019, 4 pages.

* cited by examiner

FULFILLMENT OF SERVICE REQUIREMENTS

RELATED APPLICATION

This application claims priority to PCT Application No. PCT/CN2021/072311, filed on Jan. 15, 2021, which is incorporated herein by reference in its entirety.

FIELD

Example embodiments of the present disclosure generally relate to the field of communication, and in particular, to devices, methods, apparatuses and computer readable storage media for fulfillment of service requirements.

BACKGROUND

Contract between a Network Service Provider (NSP) and a Network Service Customer (NSC) is expressed in light of Service Level Agreement (SLA). The SLA describes service characteristics such as a coverage area (also referred to as an area of service), radio spectrum or frequency, user mobility, service availability and reliability and the like. The SLA service characteristics are used to derive actual resource requirements that need to be satisfied by deployed network functions (NFs) of a fifth-generation (5G) network.

The area of service in Groupe Special Mobile Association (GSMA) Generic network Slice Template (GST) (such as NG.116 v3.0) and the coverage area in service profiles of the 3rd Generation Partnership Project (3GPP) specifications such as 3GPP TS 28.541 v17.0.0 are both defined as a geographical area that corresponds to a geographic region.

In 5G, a plurality of tracking areas (TAs) are assigned by a core network to one registration area (RA) for a user equipment (UE) when the UE registers to the network. A tracking area (TA) represents a group of cells, where all cells are assigned to exactly one Tracking Area Code (TAC) or Tracking Area Identifier (TAI). Such grouping of cells may be used to minimize the signaling. For example, when paging a UE, the core network needs to know a location of the UE only with the granularity of the RA that is a set of tracking areas. Therefore, the core network does not need to know the individual cell where the UE is camping, and as consequence a radio access network (RAN) does not need to send to the core network an update for each handover of the UE from a cell to another cell. The update is sent only if the UE moves into another RA. Accordingly, if the RA bigger, less signaling will be needed for cell update. However, when paging the UE, a paging request for the UE needs to be sent to all cells of the RA.

SUMMARY

In general, example embodiments of the present disclosure provide devices, methods, apparatuses and computer readable storage media for fulfillment of service requirements.

In a first aspect, a device is provided which comprises at least one processor and at least one memory including computer program code. The at least one memory and the computer program code are configured to, with the at least one processor, cause the device to collect knowledge about a plurality of network and management domains including at least a plurality of access network domains and determine service requirements from a service consumer. The device is further caused to select, based on the service requirements from the service consumer and the collected knowledge about the plurality of network and management domains, a set of access network domains from the plurality of access network domains to provide a service area for the service consumer.

In a second aspect, a device is provided which comprises at least one processor and at least one memory including computer program code. The at least one memory and the computer program code are configured to, with the at least one processor, cause the device to collect knowledge about a plurality of network and management domains including at least an access network domain and determine requirements for at least a part of a service area for a service consumer within the access network domain. The device is further caused to determine, based on the requirements for the at least part of the service area and the collected knowledge about the plurality of network and management domains, mapping of the at least part of the service area to a set of tracking areas within the access network domain.

In a third aspect, a method is provided at a service provider. In the method, knowledge about a plurality of network and management domains including at least a plurality of access network domains is collected, and service requirements from a service consumer are determined. Based on the service requirements from the service consumer and the collected knowledge about the plurality of network and management domains, a set of access network domains is selected from the plurality of access network domains to provide a service area for the service consumer.

In a fourth aspect, a method is provided at an access network domain. In the method, knowledge about a plurality of network and management domains including at least the access network domain is collected, and requirements for at least a part of a service area for a service consumer are determined within the access network domain. Based on the requirements for the at least part of the service area and the collected knowledge about the plurality of network and management domains, mapping of the at least part of the service area to a set of tracking areas is determined within the access network domain.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 1(*b*) illustrates an example situation with one layer of cells and one or more slices added;

Throughout the drawings, the same or similar reference numerals represent the same or similar element.

DETAILED DESCRIPTION

Figure 1A:
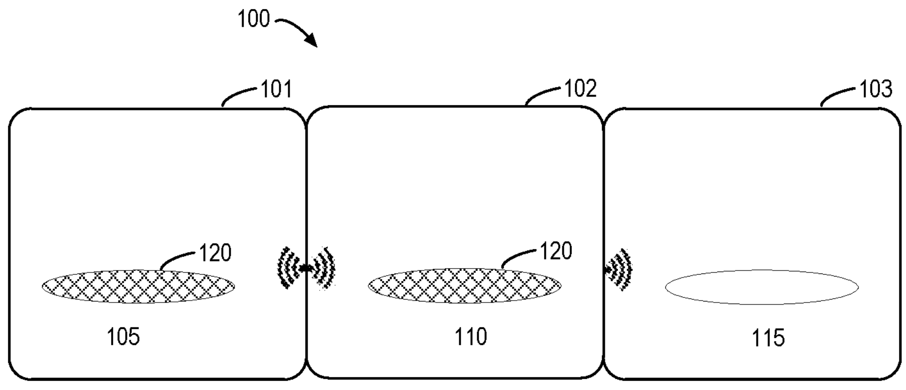
FIG. 1(*a*) illustrates an example situation with one layer of cells and one slice.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "service area" refers to a geographical area, corresponding to a geographical region, or geographical zones, or longitude and latitude scope, in which a service consumer can obtain a service from a network. The service area may comprises an area of service in Groupe Special Mobile Association (GSMA) Generic network Slice Template (GST) (such as NG.116 v3.0) and a coverage area in service profiles of the 3rd Generation Partnership Project (3GPP) specifications such as 3GPP TS 28.541 v17.0.0. In the context of the present disclosure, the terms "service area", "coverage area" and "area of service" are used interchangeably.

As used herein, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

In 5G, a set of cells are grouped to a tracking area (TA) and a plurality of TAs are assigned by a core network to one registration area (RA) for a user equipment (UE) when the UE registers to the network, so as to minimize the signaling. For example, a RAN does not need to send to the core network an update for each handover of the UE from a cell to another cell, but only needs to send the update if the UE moves into another RA. Accordingly, if the RA is bigger, less signaling will be needed for cell update. However, the paging is performed with the granularity of the RA. When paging the UE, a paging request for the UE needs to be sent to all cells of the RA. As a result, if the RA is bigger, the more signaling will be needed for paging.

Moreover, the TAs assigned to the RA of the UE should belong to TAs allocated to network slices identified by a configured, subscribed or allowed Single Network Slice Selection Assistance Information (S-NSSAI) list (S-NSSAIList) of the UE. Therefore, the coverage area in the service profiles need to be mapped to a TA list assigned to cells which are selected to support the coverage area.

All cells in a TA need to support the same set of slices. As long as a UE moves within a TA, the UE is able to receive the same Tracking Area Code (TAC) via the system information broadcast (SIB1) and knows that it will be able to use the same slices. Therefore, the UE can be sure that it does not need to re-negotiate the supported slices. If two (or multiple) cells support the same set of slices, then these cells are allowed to have same TAI, but the cells may have different TAIs. If two cells shall support different sets of slices, these cells must have different TAIs.

The assignment of TA(s) to cells is generally defined during an initial network plan and optimization progress where a given geographic area is simply mapped to TA(s). Conventionally, such a process is performed without analytics, for example, without considering statistics or forecasting for network services, and hence could potentially cause performance degradation and resource inefficiency, especially when: (i) each cell can only be associated to one TA at a time and (ii) an S-NSSAIList configured in all cells that form a TA should be same.

As such, the conventional process for assignment of TA(s) to cells may cause several problems. For example, on one hand, if each TA or RA is too small, uplink (UL) signaling load (for example, for TA/cell/RA update) cannot be minimized. On the other hand, if each TA or RA is too large, downlink (DL) signaling load (for example, for paging) cannot be minimized. Moreover, on one hand, the coverage requirement cannot be satisfied if all TAs allocated to the slice are smaller than the TAs that is actually required. On the other hand, if TAs allocated to the slice cover a larger area than the expected area, the usage of the radio resource will be inefficient. In addition, although the coverage area of a service is matched but other service requirements may not be satisfied in the areas, further reconfiguration of TAs or cells may be caused to conflict with or impact to other services sharing the same cells or TAs.

In 5G, the minimization of signaling might additionally be achieved by assigning multiple TAs to one RA for a particular UE. For example, the core network may dynamically define a RA per UE as a set of TAs. As a consequence, it might be possible that the TAs in 5G are very small, even as small as a single cell. The optimization of grouping cells to TA(s) and grouping TAs to RA(s) is complicated because a geographical area might be covered by multiple cells.

The optimization of planning and assigning TAs to a slice during a slice commissioning phase is also complicated. The cells covering a geographical area might support the same set of slices or instead support different sets of slices depending on the need of the operators.

Figure 1B:
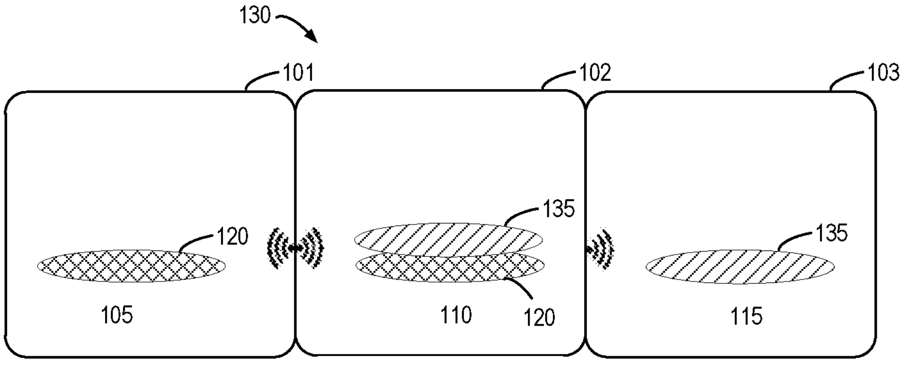

FIG. 1(*a*) shows an example situation 100 with one layer of cells and one slice. In the situation 100, there are three areas 101, 102 and 103 each of which is configured with one layer of cell including cells 105, 110 and 115, respectively. The cells 105 and 110 are grouped into a TA with TAI=1 and form a slice 120. The cell 115 belongs to a TA with TAI=3, which is used for no slice.

FIG. 1(*b*) shows an example situation 130 with one layer of cells and one or more slices added. In the situation 130, the cell 105 belongs to a TA with TAI=1, the cell 110 belongs to a TA with TAI=2, and the cell 115 belongs to a TA with TAI=3. The cells 105 and 115 support one slice where the cell 105 supports the slice 120 and the cell 115 supports a different slice 135 thus the TA assigned to the cells are not changed. The cell 110 supports two slices including the slices 120 and 135, then a new TA is assigned to the cell.

Figure 2A:
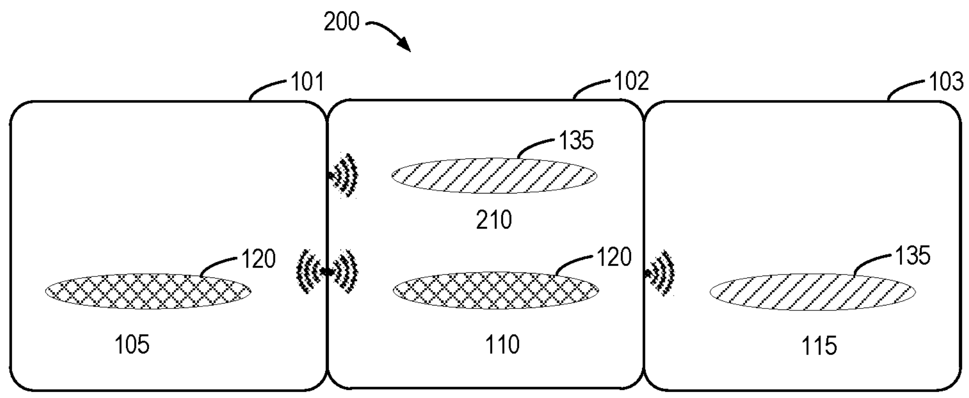
FIGS. 2(*a*) and 2(*b*) illustrate example situations with two layers of cells and two slices.
Figure 2B:
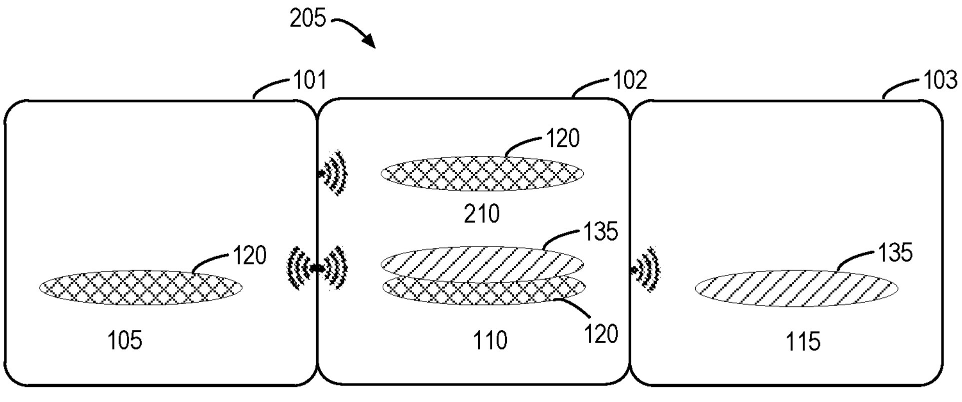

More layers of cells and more slices may result in many possible combinations of slice per cell. FIGS. 2(*a*) and 2(*b*) show example situations 200 and 205 with two layers of cells and two slices. In the situations 200 and 205, the area 102 is configured with two layers of cells 110 and 210. In the situation 200, cell 110 is only allocated to slice 120 as cell 105, same TA, TAI=1, is assigned to the cell 110. Similarly, the cell 210 is only allocated to the slice 135 as cell 115, and the same TA, TAI=3, is assigned to the cell 210. In the situation 305, as the cell 110 is allocated to both the slices 120 and 135, and as the slice list supported by the cell 110 is different to other cells, a new TA, TAI=4, is assigned to the cell 110.

Only two situations 200 and 205 are shown in FIGS. 2(*a*) and 2(*b*) with more than two layers of cells and two slices. If all the possibilities are allowed for the grouping of cells to TA and grouping of TA to RA, then the number of possible combinations to assign TA and RA is very high, such that it is very difficult to find an optimal assignment.

The inventors notice that a Network Data Analytics Function (NWDAF) might provide analytics regarding the observed and expected mobility of a UE (or classes of UEs). Likewise, a Management Data Analytics Services (MDAS) producer may provide analytics regarding the signaling load based on general performance measurements and network configurations such as frequency of cells on one hand. On the other hand, the MDAS producer (MDASP) may provide analytics for the area specified by the SLA of different slices in order to find optimized cells probably with optimized TA replan. The MDASP and NWDAF shall perform for each UE an optimized assignment of TAs to a RA. In order to implement such optimization, the MDASP and NWDAF may require standardized Application Programming Interfaces (APIs) in order to allow interoperability.

In the 3GPP specification such as TR 28.809, the mapping of TA(s) to cells is focusing on a use case that optimizes the paging process by keeping track of the user locations and identifying specific locations. Timing may be combined to facilitate the tracking of users. As such, the paging optimization may be achieved to minimize the paging signaling to find users.

An approach to enhance the optimization of a paging area is to cluster or re-cluster cells to one or more TAs. The clustering and re-clustering may be implemented by a Self-Organized Network (SON). The TA forming or the cell clustering depends on a paging success rate (for example, success probability of the first paging), and user distribution and user mobility are adopted to specify the size of TA or cells cluster in order to optimize the paging success rate and minimize the paging attempts. However, this approach specifies neither a geographical area nor a RA.

Another approach to optimize the mapping of TA(s) to cells is to take radio capabilities and features into account in implementing the SLA and service coverage. For example, radio pixels are assembled where a pixel represents a minimum geo-area unit that has unified SLA characteristics by combing different radio features of gNBs, in order to meet a given slice SLA. By now, the mapping of TA(s) to cells does not consider analytics and prediction in terms of mobility, load and other optimization parameters.

Example embodiments of the present disclosure provide a new analytics service to analyze and break the service requirements from a service consumer down to a plurality of access network (AN) domains such as radio access network (RAN) domains. The analytics service is based on the knowledge about a plurality of network and management domains that is collected by a service provider, such as a Management Data Analytics Service (MDAS) producer. The plurality of network and management domains comprise a plurality of access network domains, a core domain, an end-to-end domain (or a cross domain) and any other domains. The knowledge may be associated with measurements or key performance indicators (KPIs) related to mobility, load, performance or the like, analytics reports, and configurations related to tracking areas, spectrum or the like. Based on the collected knowledge and the service requirements of the service consumer, a set of access network domains is selected from the plurality of access network domains to provide a service area for the service consumer.

Further, at an AN domain, a new analytics service is provided to determine mapping of at least a part service area to tracking areas. The geographical area provided by an AN domain may cover a part of or a whole of the service area to be provided for the service consumer. The mapping is determined based on the knowledge that is collected within a plurality of network and management domains, including the access network domain, other access network domains, a core domain, a cross domain and any other domains. The knowledge may comprise cell related information or other information collected by a gNB and mobility information from a core domain, for example, through the cross domain, or any other information. In some example embodiments, the knowledge may be related to tracking areas in the AN domains.

The service required by the service consumer may comprise any suitable network service. As an example, the service may comprise creation, modification or update of a network slice. Only for the purpose of discussion, some example embodiments will be discussed in the scenario that the service is related to a network slice such as network slice creation, modification or update.

In this way, the service provision for a service consumer may consider network characteristics such as mobility, load, performance, configurations, topology or the like, which is more efficient.

Figure 3:
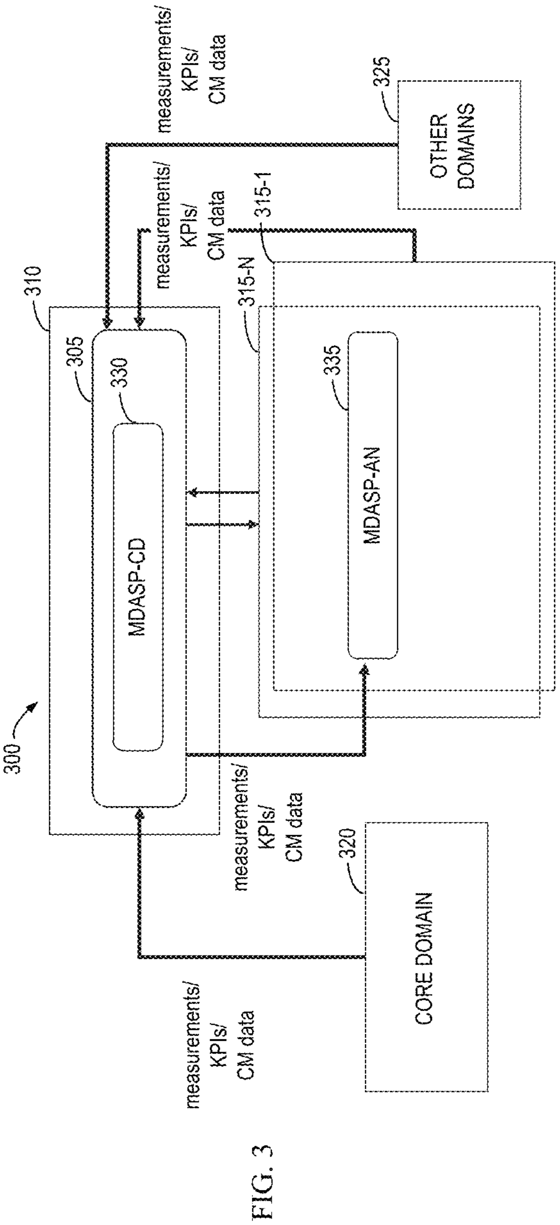
FIG. 3 illustrates an example environment in which example embodiments of the present disclosure can be implemented.

FIG. 3 shows an example environment 300 in which example embodiments of the present disclosure can be implemented.

The environment 300 comprises a service provider 305 in a cross domain 310 (also referred to as an E2E domain). The service provider 305 can provide any suitable service to a service consumer (not shown). In the example embodiments where the service is related to a network slice, the service provider 305 may be implemented by a network slice provider (NSP) or a network slice management function (NSMF).

As shown in FIG. 3, the environment 300 further comprises a plurality of access network (AN) domains 315-1 . . . 315-N (collectively or individually referred to as an AN domain 315) where N represents any suitable positive integer. The AN domains 315-1 . . . 315-N may comprise RAN domains and any other AN domains.

The service provider 305 can communicate with the AN domains 315. For example, the service provider 305 can collect information such as measurements, KPIs or customer management (CM) data from the various domains, including, the cross domain 310, access network (AN) domains 315-1 . . . 315-N (collectively or individually referred to as an AN domain 315) where N represents any suitable positive integer. The information can further be collected from a core domain 320 and other domains 325. The information includes any suitable knowledge about the various network domains including the AN domains 315, the core domain 320, the cross domain 310 and any other domains. As an example, the knowledge may be associated with mobility, load and performance, analytics reports, configurations related to tracking area and spectrum, or the like.

Some example embodiments of the present disclosure introduce a new cross-domain analytics service in the service provider 305 to break down the service requirements of the service consumer to one or more smaller geographical areas provided by one or more AN domains 315, for example, including network slice subnet providers (NSSPs) or network slice subnet management functions (NSSMFs), according to the collected knowledge about the various network domains.

As shown in FIG. 3, as an example, the service provider 305 may comprise a cross-domain MDAS producer (MDASP-CD) 330. The knowledge collection and the coverage area breaking-down may be performed by the MDASP-CD 330. Just for the purpose of discussions, some embodiments of the present disclosure are discussed by using the MDASP-CD 330 to implement the cross-domain analytics service.

In addition to the MDASP-CD 330, the service provider 305 may comprise any other entities (not shown), including a service management device such as a service management service (MnS) producer, a decision and execution (Dec&Exc entity) and the like, which can act as a MDAS consumer (MDASC) to communicate with the MDASP-CD 330. It is also possible that the cross-domain analytics service is implemented at another entity, device or NF of the service provider 305.

After the service requirements of the service consumer is broken down into the requirements of one or more AN domains 315, a new analytics service in a AN domain can be invoked to map a geographical area to a set of TAs based on knowledge collected from the various network domains including this AN domain, other AN domains, the cross domain 310 and any other domains. The knowledge may include, for example, cell related information such as a serving area, performance, isolation requirements, or load of cells in assigned or planned tracking areas, or other information collected by a gNB in the AN domain 315, or mobility information from the core domain 320, or measurements or KPIs from the cross domain 310, or other information from other domains 325. In some example embodiments, the knowledge collected at an AN domain 310 may comprise performance measurements related to TAs, for example, including measurements associated with load utilization of a TA, a number of active or passive UEs in a cell within a TA, or a number of handovers among cells within a TA and among cells between neighboring TAs.

As an example, the AN domain 315 may comprise an AN-domain MDAS producer (MDASP-AN) 335. The knowledge collection and cell selection within the AN domain 315 may be performed by the MDASP-AN 335. Just for the purpose of discussions, some embodiments of the present disclosure are discussed by using the MDASP-AN 335 to provide the AN domain analytics service. It is also possible to use any other entities at the AN domain 315 to provide the service.

Some example embodiments of the cross-domain analytics service will be discussed below with reference to FIGS. 4 and 5.

Figure 4:
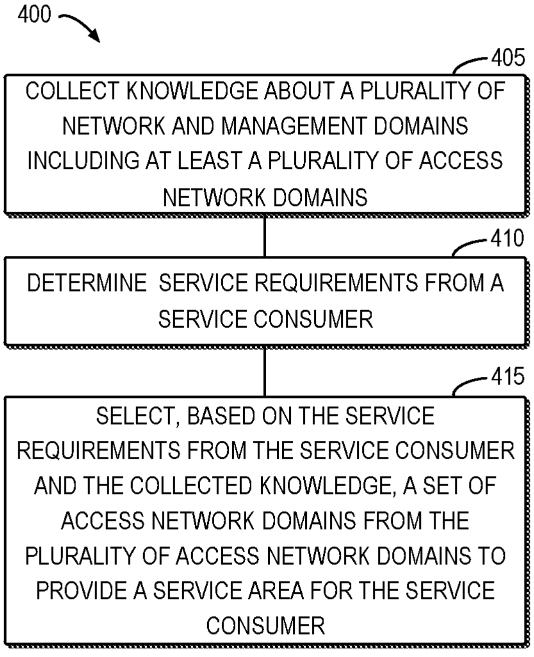
FIG. 4 illustrates a flowchart of an example method according to some example embodiments of the present disclosure.

FIG. 4 shows a flowchart of an example method 400 according to some example embodiments of the present disclosure. The method 400 can be implemented at the service provider 305 or MDASP-CD 330 as shown in FIG. 3. For the purpose of discussion, the method 400 will be described with reference to FIG. 3.

At block 405, the knowledge about a plurality of network and management domains including at least the AN domains 315-1 . . . 315-N is collected at the service provider 305 such as the MDASP-CD 330. The collected knowledge may comprise any suitable information about the various network domains including the AN domains 315-1 . . . 315-N, the core domain 320, the cross domain 310 and any other domains. For example, the collected knowledge may comprise a service, service level specification (SLS), performance measurements, minimization of drive test (MDT) data, UE mobility, configuration data or network topology.

The knowledge may be collected at the service provider 305 autonomously or in response to an event. For example, the MDASP-CD 330 may autonomously, or as a response to an analytics request from a service management device, request other domains such as a management domain or various network domain, to send the information such as measurements or KPIs related to mobility, load and performance, analytics reports, and configurations related to tracking area, spectrum or the like. Alternatively or in addition, the various information may be reported from other domains to the service provider 305 autonomously.

At block 410, service requirements from a service consumer are determined at the service provider 305. The determination of the service requirements may be triggered by a service request from the service consumer. For example, the service consumer may request the service provider 305 to create or update a service. Service Level Specification (SLS) may be included in the request for the service create or update request, which may include requirements for a coverage area (for example, an area of service represented in geographic areas, such as country, region, geographical partitioning, and the like), radio spectrum, isolation level, Quality of Service (QOS) parameters, device velocity, throughput, latency, or the like.

The request from the service consumer may be received by a service MnS producer (such as a decision and execution entity) at the service provider 305. Then, in order to assign resources that satisfy the coverage area requirements, the MnS producer as a MDAS consumer (MDASC) may send a request including the corresponding service requirements to the MDASP-CD 330 to obtain a list of AN domains to provide a service area for the service consumer. The request may trigger the MDASP-CD 330 to send an analytics report for a coverage area. Accordingly, the MDASP-CD 330 may analyze the requirements of the coverage area together with other SLS requirements such as radio spectrum, isolation level or the like.

In some example embodiments, the MDASP-CD 330 may trigger reconfiguration of the AN domains 315. For example, the MDASP-CD 330 may collect mobility and performance related measurements and analytics reports to check if the service is available (and just available in the agreed area of service), and all other SLS requirements are satisfied.

Based on the determined service requirements of the service consumer and the collected knowledge about the plurality of network and management domains, at block 415, a set of AN domains is selected at the service provider 305 from the plurality of AN domains to provide a service area for the service consumer. For example, based on historic or new knowledge collected from the various domains, the MDASP-CD 330 breaks down the service area to one or more geographical areas and maps each area to the corresponding AN domain.

Accordingly, at least a part (for example, a part or a whole) of the service area may be mapped to a given AN domain. In some example embodiments, the service provider 305 may determine mapping of the at least part of the service area to a set of TAs within the AN domain. For example, if the MDASP-CD 330 is asked to provide a tracking area list of each domain, the MDASP-CD 330 may trigger to get an analytics report of the tracking area list from MDASP-AN. The mapping of the at least part of the service area to a set of TAs within the AN domain may be determined by the MDASP-CD 330 based on the collected knowledge about the various network domains.

In some example embodiments, the MDASP-CD 330 may trigger the respective AN domains to send an analytics report for mapping of geo area to the TA list. For example, the MDASP-CD 330 may send to the MDASP_AN-a request for a list of TAs for the at least part of the service area. Accordingly, the MDASP-CD 330 may receive from the MDASP_AN an indication of the mapping of the at least part of the service area to the set of TAs.

The indication of the mapping may be implemented in any suitable way. As an example, the indication may be represented by a list of a service sub-area and the corresponding list of TAs. The service sub-area may be represented by a geographical sub-area represented by geographical zones, or scope of geographical coordinates (latitude, longitude and elevation), and the like. The TA may be indicated by an tracking area identifier (TAI) that includes Public land mobile network identifier (PLMNId) plus TAC.

The MDASP-CD 330 constructs a list of the mapping based on the indication of the mapping received from the MDASP_AN as well as, for example, the collected knowledge. In some example embodiments, the MDASP-CD 330 may send an analytics report to the MDSAC. The report may comprise a list of mapping between an AN domain and a sub-area list. Each sub-area item in the subarea list may comprise a geographical sub-area and a TA list that is a list of tracking area identifiers (TAIs) covering the geographic sub-area.

The TA list is optional. In some example embodiments, the MDASP-CD 330 may report the list of mapping without tracking area information to the MDSAC such as a decision and execution entity at the service provider 305. In this case, the decision and execution entity may request the individual AN domains 315 to provide the TA list for a geographical sub-area.

In some example embodiments, the MDASP-CD 330 may automatically trigger the reconfiguration of the AN domains 315. For example, if the MDASP-CD 330 determines based on the collected mobility and performance related measurements and analytics reports that the coverage or other requirements were not satisfied, the MDASP-CD 330 may trigger the AN domain to reallocate the cells and replan or reconfigure the TAs for the service.

In some example embodiments, TA to RA mapping is introduced at the service provider 305. For example, the MDASP-CD 330 may use the of lists of TAs from the various AN domains 315 to determine mapping of a RA to a set of TAs of the TAs assigned to the service within at least an AN domain of the set of AN domains for providing the service area. The RA to TA mapping is determined based on the service requirements from the service consumer and the collected knowledge about the plurality of network and management domains. In some example embodiments, recommendation of a RA (for example, which TAs could be included in the RA) for the service (for example, a network slice) may be provided according to mobility pattern (predicted based on the collected knowledge) of the terminal devices (such as UEs) of the service.

An example process of the cross-domain analytics service will be discussed below with reference to FIG. 5.

Figure 5:
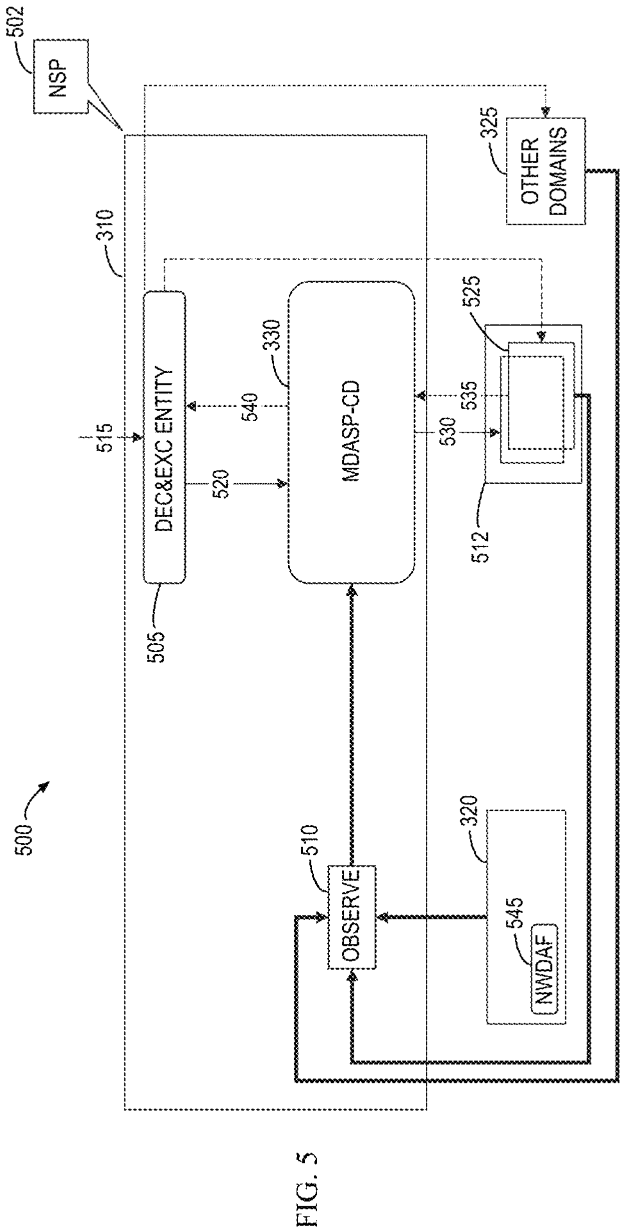
FIG. 5 illustrates an example process of a cross-domain analytics service according to some example embodiments of the present disclosure.

FIG. 5 shows an example process 500 of the cross-domain analytics service according to some example embodiments of the present disclosure. In this example, the service required by the service consumer is a network slice creation. The service provider 305 is implemented by a NSP 502 and comprises the MDASP-CD 330, a decision and execution (or Dec&Exc) entity 505, an observation entity 510 (or Observe). The AN domain 325 is implemented as a RAN domain 512.

As shown in FIG. 5, after receiving (515) a request for a network slice creation with SLS requirements (including the requirements for the service area) from a network slice consumer (NSC), a network slice provider (NSP) such as the decision and execution (Dec&Exc) entity 505 calls (520) the MDAS-CD 330 to determine the related AN domains such as RAN network slice subnet providers (NSSPs) 525 to provide a part or a whole of a service area.

Based on historic or new knowledge collected from the AN domains such as the NSSPs 525, the core domain 320 (or a core network), the cross domain 310 (or E2E domains) or other domains 325, the MDASP-CD 330 analyzes the coverage area. In this example, as shown in FIG. 5, the information is collected by the observation entity 510 and forwarded to the MDASP-CD 330.

In this example, the MDASP-CD 330 breaks down the service area to multiple geographical sub-areas and maps each geographical sub-area to a RAN NSSP 525. In some example embodiments, based on the knowledge of the MDASP-CD, the service area may be broken down to all available NSSPs or exclude some NSSPs. The geographical sub-area can also be in various granularity.

Then, the MDASP-CD 330 goes (530) through all impacted RAN NSSP 525 identified before with the related geographical sub-area allocated to the NSSP, and receives (535) an indication of the mapping of geographical area to TAs for each geographical sub-area from the NSSP 525. In some example embodiments, other relevant requirements, such as isolation and load requirements will also be provided to the NSSP 525 to enable the NSSP 525 to consider other performance characteristics when selecting/planing TA(s) to satisfy the service requirements.

The RAN NSSP 525 may leverage an intra-domain MDAS to assign suitable track areas to each geographical sub-area in a request from the MDASP-CD 330, and return a list of mapping of geographical areas to TAs to the MDASP-CD 330.

The MDASP-CD 330 analyzes responses from all concerned NSSPs 525 and constructs a mapping list for the network slice. Each item of the list includes one NSSP and a list of sub-areas with each item including a sub-area and a list of mapped TAs. Then, the MDASP-CD 330 reports (540) the mapping list to the Dec&Exc entity 505. In addition, the MDASP-CD 330 may recommend registration area which including a list of tracking areas for UE of the slices according collected knowledge. In this case, the Dec&Exc entity 505 could call the NSSP 525 to create/update network slice subnets (NSSs) with the TA list as input parameters.

Alternatively, the MDASP-CD 330 may construct a mapping list for the network slice without interacting with NSSPs 525 and report the mapping list without tracking area information to the Dec&Exc entity 505 of the NSP. Accordingly, the Dec&Exc entity 505 will pass geographical areas to each NSSP 525 when creating/updating NSS or get TA list for the geo area.

In some example embodiments, the NSP 502 may call each RAN NSSP 525 in the mapping list to create NSSs to satisfy coverage or other requirements of the network slice, the input in the call could be comprise information about either a geographical area or the TA list.

TA(s) to RA mapping is introduced in a network slice provider (such as NSP or NSMF) considering the user mobility patterns from a Network Data Analytics Function (NWDAF) 545 in the core domain 320.

Then, the NSP 502 may reconfigure the NSSP 525 for new S-NSSAIs and TAIs mapping. The NSSP 525 may synchronize the creation results with the MDAS-CD 330 as training data of next-time network slice creation or update.

The MDASP-CD 330 may collect mobility related measurements or KPI from both the core domain 320 and the RAN domain 512 to check if the UEs of the slice were correctly and fairly distributed in required geographical area. For example, the UEs do not cross a geographical boundary, or not narrow down to a smaller boundary, and reliability and availability are expected.

The MDASP-CD 330 may trigger reallocating cells for the slice, or replan/reconfiguration of the TAs for the slice in case the coverage or other SLS requirements were not satisfied.

In some example embodiments, measurements or KPIs of RAN and CN are enhanced to support the analytics service. Examples of the input of the MDASP-CD 330 are show as below.

| Data category | Required data |
|---|---|
| Slice | "S-NSSAI" as defined in TS 23.501 - To identify a slice |
| SLS | Area of service/coverage area represented as countries, geographical regions, geographical zones or the like, radio spectrum, isolation level, reliability |
| Performance Measurements | Radio Conditions:<br>Transport Block (TB)/Channel Quality Indicator (CQI)/Modulation and Coding Scheme (MCS) related measurements as per TS 28.552<br>Resource utilization:<br>Radio resource utilization: Uplink (UL)/Downlink (DL) Physical Resource Block (PRB) usage as per TS 28.552<br>Network Function (NF) Virtualization: CPU, memory, disk as per TS 28.552<br>Performance Measurements (PMs)/KPIs on UE performance:<br>RAN UE Throughput: Impact of NG-RAN on service quality as per TS 28.554<br>UE throughput: IP throughput of end users as per TS 28.552<br>End-to-End Latency of 5G network as per TS 28.554<br>IP latency measurements as per TS 28.552<br>Packet delay as per TS 28.552<br>Network Slice Subnet (NSS) related KPIs |
| MDT Data | UE Measurements related to Reference Signal Received Power (RSRP), RSRQ (Reference Signal Received Quality), SINR (Signal to Interference and Noise Ratio), UE location |
| NWDAF Data | UE Mobility Analytics: Predict UE location of specific slice |
| Configuration Data | Current network resource module (NRM) configuration of the Managed Object Instances (MOIs)<br>NRM attributes affecting the location and virtual Network |

-continued

| Data category | Required data |
|---|---|
| | Function (NF) resource allocation and configuration especially for network slice, frequency of cells, and the like. |
| Network Topology | Topology of the network |

Moreover, examples of the output of the MDASP-CD 330 are show as below.

| Data category | Report data |
|---|---|
| List of mapping | [<NSSP, [<subArea, [TAI]>]>]<br>[ ]: represent a list<br>TAI: tracking area identifier which is comprise of PLMNId + TAC<br>subArea: geographical sub-area represented by geographic zones, or scope of geo coordinates (latitude, longitude and elevation), and the like<br><subArea, [TAI]>: map between geographical sub-areas and tracking areas, one subArea can be translated to a TAI list<br><NSSP, [<subArea, [TAI]>]>: map between one NSSP and geographical sub-areas. One NSSP can support a list of geographical sub-areas, each geographical sub-area can be translated to a list of TAIs. |

In addition to the cross-domain analytics service, some example embodiments of the present disclosure introduce a new AN domain analytics service to map a geographical area to a set of TAs based on knowledge collected within an AN domain 310. The example embodiments in this regard will be discussed below with FIGS. 6 and 7.

Figure 6:
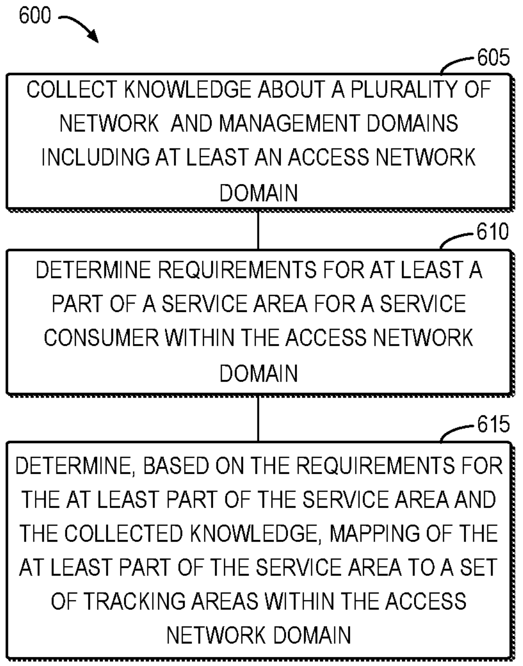
FIG. 6 illustrates a flowchart of an example method according to some other example embodiments of the present disclosure.

FIG. 6 shows a flowchart of an example method 600 according to some other example embodiments of the present disclosure. The method 600 can be implemented at the AN domain 315 or MDASP-AN 335 as shown in FIG. 3. For the purpose of discussion, the method 600 will be described with reference to FIG. 3.

At block 605, the knowledge about a plurality of network and management domains including an AN domain 315 is collected at the AN domain 315 such as the MDASP-AN 335. For example, the MDASP-AN 335 may collect measurements or KPIs related to mobility (feed by a E2E management domain), load, performance, or the like, analytics reports (feed by a E2E management domain), as well as configurations related to tracking areas, spectrum frequency. The collected knowledge may comprise any suitable information about the various network domains including the AN domains 315-1 . . . 315-N, the core domain 320, the cross domain 310 and any other domains. For example, the collected knowledge may be associated with a service, service level specification, performance measurements, MDT data, UE mobility, configuration data or network topology. In some example embodiments, the performance measurements may be related to TAs. For example, the measurement may be associated with load utilization of a TA, a number of active or passive UEs in a cell within a TA, or the number of handovers among cells within a TA and among cells between neighboring TAs.

The knowledge may be collected by the MDASP-AN 335 autonomously or in response to an event. For example, the MDASP-AN 335 may autonomously, or as a response to an analytics request from the service provider 305, collect the related information such as configuration data, performance measurements, analytics reports, or network topology.

At block 610, the requirements for at least a part of a service area for a service consumer within the AN domain 315 are determined. The determination of the requirements may be triggered by a request from the service provider 305 to provide the at least part of the service area, which comprises the requirements for the at least part of the service area. For example, the MDASP-AN 335 may receive a request for an analytics report for mapping of a sub-area (represented by a geographical area) to TA list from the MDASC such as a decision and execution (Dec&Exc) entity at the AN domain 315. The request may include the indications of the related sub-areas. Upon the reception of the request for the analytics report for the AN domain 315, the MDASP-AN 335 may analyze the (geographical) sub-area (s) together with other SLS requirements such radio spectrum, isolation level, and the like. In some example embodiments, the MDASP-AN 335 may autonomously collect the knowledge.

Based on the determined requirements for the at least part of the service area and the collected knowledge about the plurality of network and management domains, at block 615, mapping of the at least part of the service area to a set of tracking areas is determined within the AN domain 315. In some example embodiments, a set of cells may be selected from a plurality of cells within the AN domain 315 to provide the at least part of the service area. For example, according to the historic or new collected knowledge, such as cell or Radio Frequency (RF) location, load, isolation requirements of on the cells, the MDASP-AN 335 selects a set of cells fitted in the at least part of the service area such as one or more geographical sub-areas.

The MDASP-AN 335 may further determine the association between the selected set of cells and the set of tracking areas. For example, if the selected cells are not assigned with any tracking area code (TAC), new TA(s) may be created and TACs are assigned to related cell(s). Otherwise, if the cell(s) were already assigned with TAC(s), and existing TAs can satisfy the geographical sub-areas and other requirements of the new and existing services, the fitted existing TA(s) will be selected.

If existing TA(s) cannot satisfy the new requirements, or existing services in the TAs could be negatively impacted, the MDASP-AN 335 may trigger to offload services from the free/spare cells (in case the existing service will not be impacted), re-plan TACs and assign new TAC(s) to the cells for the new service.

In some example embodiments, according to selected/assigned TACs, MDASP-AN 335 generates a list of mapping and reports to the MDASC. The list includes a list of mapping of sub-areas to a TA list. In each list item, a sub-area represents a geographic area, and the TA list is a list of tracking areas covering the geographical sub-area. Tracking area in each item of the TA list can be represented by a TAI, or an association between a cell and a TAI.

In some example embodiments, the MDASP-AN 335 may trigger creation or modification of cell(s)/TA(s). For example, the MDASP-AN 335 may collect mobility and performance related measurements and analytics reports to check if the service available and just available in the agreed sub-area, and all other SLS requirements are satisfied. The MDASP-AN 335 may trigger reallocation of cells for slices, replan/reconfiguration of cells and/or tracking areas in case that the coverage or other requirements were not satisfied. An example process of the intra-domain analytics service will be discussed below with reference to FIG. 7.

Figure 7:
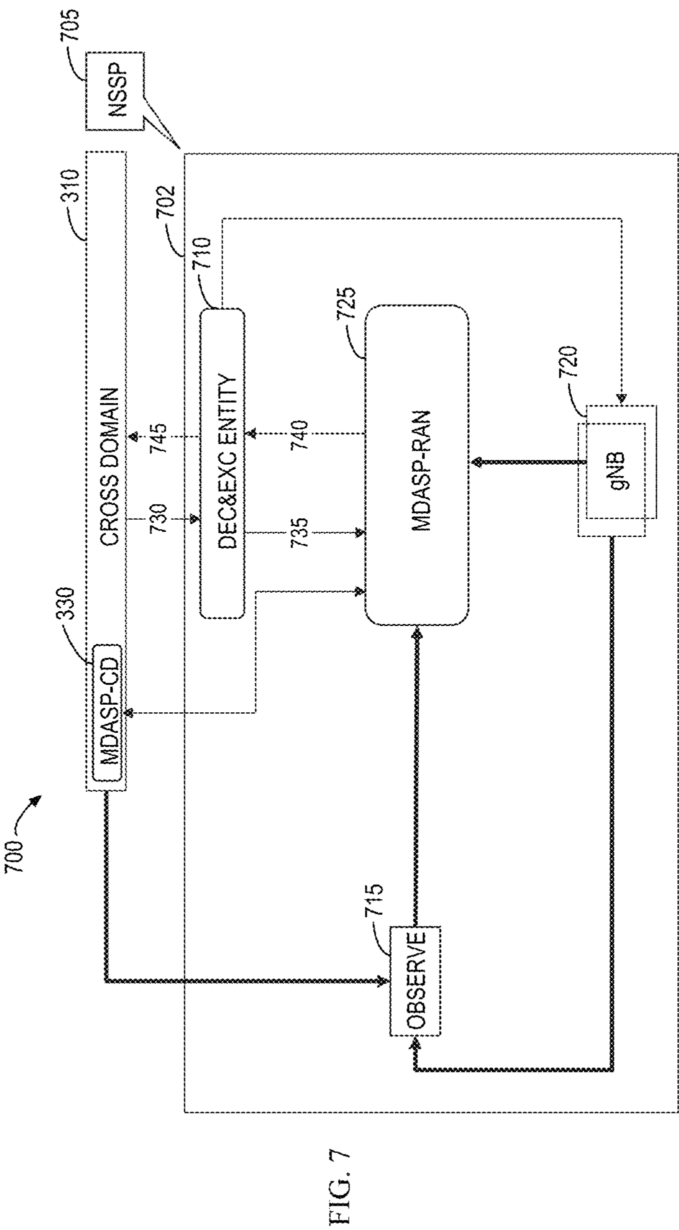
FIG. 7 illustrates an example process of am access network-domain analytics service according to some example embodiments of the present disclosure.

FIG. 7 shows an example process 700 of the AN-domain analytics service according to some example embodiments of the present disclosure. In this example, the service required by the service consumer is associated with a network slice. The AN domain 315 is implemented by a RAN domain 702 and comprises a NSSP 705 that comprises a decision and execution entity (or Dec&Exc) 710, an observation entity 715 (or Observe) and gNBs 720. The MDASP-AN 315 is implemented by a RAN domain MDAS producer (MDASP-RAN) 725.

As shown in FIG. 7, after receiving (730) a request to obtain the TA list or to create or update a NSS, which includes geographical sub-area(s) and other SLS requirements, the NSSP 705 such as the decision and execution entity 710 calls (735) the MDASP-RAN 725 to get tracking areas or cells fitted to the input geo area(s).

According to historic or new collected knowledge such as a cell or RF location, load, isolation requirements of Network Slices (identified by S-NSSAI) on the cells, the MDASP-RAN 725 selects cells fitted in geographical sub-area(s). In this example, as shown in FIG. 7, the knowledge is collected by the observation entity 715 from the gNBs 720 and other domains and forwarded to the MDASP-RAN 725.

If the selected cells are not assigned any TAC, new TA(s) would be created and TACs are assigned to related cell(s). Otherwise, if the cell(s) were already assigned TAC(s), and existing TAs can satisfy the geographical sub-areas and other requirements, the fitted existing TA(s) will be selected. If existing TA(s) cannot satisfy the new requirements, or existing Network Slice (identified by S-NSSAI) could be negatively impacted, the MDAPS-RAN 725 may propose to update cells to offload S-NSSAI from the free or spare cells (in case the existing service will not be impacted), and re-plan TACs and assign new TAC(s) to the cells.

According to selected/assigned TACs, the MDASP-RAN 725 generates a list of mapping of geographical sub-areas to tracking areas, and association between cells and TACs, as well as optional reconfiguration proposals on cells. In some example embodiments, a cell can be associated to one TA. The S-NSSAIList configured in all cells in the same TA should be same.

Then, the MDASP-RAN 725 reports (740) the list of mapping and associations to the Dec&Exc entity 710. The Dec&Exc entity 710 may further report (745) the list mapping and associations to the cross domain 310.

In some example embodiments, the NSSP 705 may configure cell with re-assigned TACs, and may configure S-NSSAI(s) in case it received a NSS creation request. The MDASP-RAN 725 may continue monitoring coverage related measurements, KPIs, or Analytics Report, to make sure that the slice is correctly and fairly distributed in required area. For example, the slice does not cross the boundary or does not narrow down to a smaller boundary, and the reliability and availability is expected. It may trigger reallocation of cells for slices, or replan and reconfiguration of cells and TACs for all S-NSSAIs in case the coverage requirements are not satisfied.

Examples of the input of the MDASP-RAN 725 are show as below.

| Data category | Required data |
|---|---|
| Slice | "S-NSSAI" as defined in TS 23.501 - To identify a slice |
| SLS | Geographical sub-area represented as geographical regions, geographical zones, latitude and longitude scope, or the like, radio spectrum, isolation level, reliability |
| Performance Measurements | Radio Conditions:<br>Transport Block (TB)/Channel Quality Indicator (CQI)/Modulation and Coding Scheme (MCS) related measurements as per TS 28.552<br>Resource utilization:<br>Radio resource utilization: Uplink (UL)/Downlink (DL) Physical Resource Block (PRB) usage as per TS 28.552<br>Network Function (NF) Virtualization: Central Processing Unit (CPU), memory, disk as per TS 28.552<br>Performance Measurements (PMs)/KPIs on UE performance:<br>RAN UE Throughput: Impact of NG-RAN on service quality as per TS 28.554<br>Packet delay as per TS 28.552<br>TA related measurements (New PMs):<br>TA load: Load utilization of an indicated TA<br>TA usage: Number of active/passive UEs in TA per cell Indicates the potential of re-configuring a TA<br>Intra/inter TA handover: Amount of handovers among cells with a TA and among cells between neighboring TAs |
| MDT Data | UE Measurements related to Reference Signal Received Power (RSRP), RSRQ (Reference Signal Received Quality), SINR (Signal to Interference and Noise Ratio), UE location |
| Configuration Data | Current network resource module (NRM) configuration of the Managed Object Instances (MOIs) - RAN coverage<br>NRM attributes affecting the location and virtual NF resource |

-continued

| Data category | Required data |
|---|---|
| | allocation and configuration, especially for network slice, frequency of cells |
| Network Topology | Topology of the network |

Moreover, examples of the output of the MDASP-RAN 725 are show as below.

| Data category | Report data |
|---|---|
| List of mapping | [<subArea, [TAI]>]<br>[ ]: represent a list<br>TAI: tracking area identifier which is comprise of PLMNId + TAC<br>subArea: geographical sub-area represented by geographical zones, or scope of geographical coordinates (latitude, longitude and elevation), or the like.<br><subArea, [TAI]>: map between sub geo area and tracking area, one subArea |
| List of cells | [cell, TAC, [<attribute, value>]]<br>[ ]: represent a list<br>[<attribute, value>]: list of attributes and corresponding values for the attributes which were proposed to be reconfigured.<br>[cell, TAC, [<attribute, value>]]: list of cells with assigned TAC and (re)configured attributes for the cells which were proposed to be created or modified. |

It should be understood that all operations and features related to the AN domain 315 as described above with reference to FIGS. 3-5 are likewise applicable to the method 600 and the process 700 and have similar effects. For the purpose of simplification, the details will be omitted.

In some example embodiments, NRM changes are introduced as below.

| IOC | Attributes |
|---|---|
| SliceProfile | subAreaList (Optional): List of geographical sub-areas |
| NetworkSliceSubnet | areaMappingList (Optional): List of mapping between geographical sub-area and tracking area (TA) list |
| TrackingArea | TAI: tracking area identifier<br>cellRef: cells associated to the tracking area |

Figure 8:
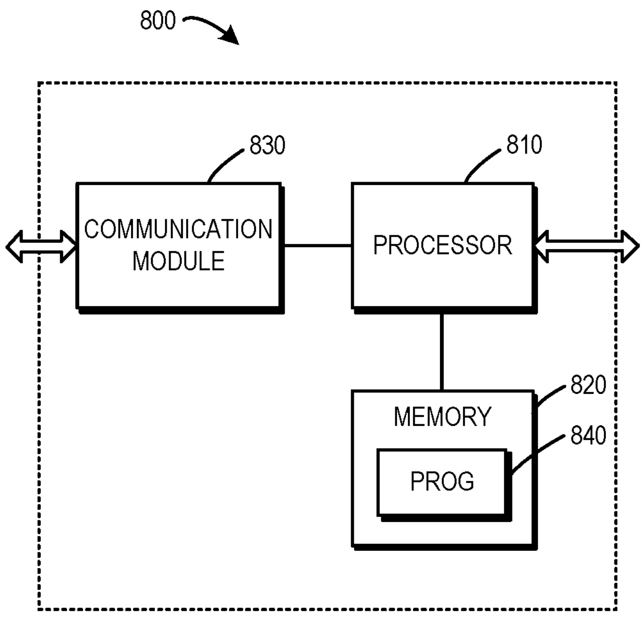
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 can be implemented at or as a part of the service provider 305 such as the MDASP-CD 330, or at the AN domain 315 such as the MDASP-AN 335.

As shown, the device 800 includes a processor 810, a memory 820 coupled to the processor 810, a communication module 830 coupled to the processor 810, and a communication interface (not shown) coupled to the communication module 830. The memory 820 stores at least a program 840. The communication module 830 is for bidirectional communications, for example, via multiple antennas or via a cable. The communication interface may represent any interface that is necessary for communication.

The program 840 is assumed to include program instructions that, when executed by the associated processor 810, enable the device 800 to operate in accordance with the example embodiments of the present disclosure, as discussed herein with reference to FIGS. 3-7. The example embodiments herein may be implemented by computer software executable by the processor 810 of the device 800, or by hardware, or by a combination of software and hardware. The processor 810 may be configured to implement various example embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

When the device 800 implemented at the service provider 305 such as the MDASP-CD 330, the processor 810 may implement the operations or acts of the analysis device as described above with reference to FIGS. 4 and 5. When the device 800 is implemented at the AN domain 315 such as the MDASP-AN 335, the processor 810 may implement the operations or acts of the analysis device as described above with reference to FIGS. 6 and 7.

All operations and features as described above with reference to FIGS. 3-7 are likewise applicable to the device 800 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the operations and acts as described above with reference to FIGS. 3-7. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: collect knowledge about a plurality of network and management domains including at least a plurality of access network domains; determine service requirements from a service consumer; and select, based on the service requirements from the service consumer and the collected knowledge about the plurality of network and management domains, a set of access network domains from the plurality of access network domains to provide a service area for the service consumer.

In some example embodiments, the device is caused to determine the service requirements from the service consumer by: receiving, from a service management device at a service provider, a request for a list of access network domains to provide the service area for the service consumer, the request comprising the service requirements from the service consumer, and determining, from the request, the service requirements from the service consumer.

In some example embodiments, the device is further caused to: for an access network domain of the set of access network domains, determine at least a part of the service area within the access network domain.

In some example embodiments, the device is further caused to: determine mapping of the at least part of the service area to a set of tracking areas within the access network domain of the set of access network domains.

In some example embodiments, the device is caused to determine the mapping of the at least part of the service area to the set of tracking areas by: sending, to the access network domain of the set of access network domains, a request to provide the set of tracking areas for the at least part of the service area; and receiving, from the access network domain, an indication of the mapping of the at least part of the service area to the set of tracking areas.

In some example embodiments, the device further comprises: obtaining a plurality of tracking areas within the plurality of access network domains; and determining mapping of a registration area to a set of tracking areas of the plurality of tracking areas assigned to the service within at least an access network domain of the set of access network domains based on the service requirements for the service, the collected knowledge about the plurality of network and management domains.

In some example embodiments, the knowledge about the plurality of network and management domains is associated with at least one of a service, service level specification, performance measurements, minimization of drive test data, user equipment mobility, configuration data or network topology.

In some example embodiments, the service requirements from the service consumer are associated with at least one of a geographical area, radio spectrum, an isolation level or reliability of a service.

In some example embodiments, the device comprises a Management Data Analytics Service producer at a service provider.

In some aspects, a device comprises: at least one processor; and at least one memory including computer program code; the at least one memory and the computer program code configured to, with the at least one processor, cause the device to: collect knowledge about a plurality of network and management domains including at least an access network domain; determine requirements for at least a part of a service area for a service consumer within the access network domain; and determine, based on the requirements for the at least part of the service area and the collected knowledge about the plurality of network and management domains, mapping of the at least part of the service area to a set of tracking areas within the access network domain.

In some example embodiments, the device is caused to determine the requirements for the at least part of a service area by: obtaining, from a service provider, a request for mapping of the at least part of the service area to a set of tracking areas, the request comprising the requirements for the at least part of the service area; and determining, based on the request, the requirements for the at least part of the service area.

In some example embodiments, the device is further caused to select a set of cells from a plurality of cells within the access network domain to provide the at least part of the service area.

In some example embodiments, the device is further caused to: determine association between the selected set of cells and the set of tracking areas.

In some example embodiments, the knowledge about the plurality of network and management domains is associated with at least one of a service, service level specification, performance measurements, minimization of drive test data, user equipment mobility, configuration data or network topology.

In some example embodiments, the performance measurements comprise measurements related to tracking area, including measurements associated with at least one of: load utilization of a given tracking area, a number of active or passive user equipment in a cell within a tracking area, or a number of handovers among cells within a tracking area and among cells between neighboring tracking areas.

In some example embodiments, the requirements for the at least part of the service area comprise at least one of coverage requirements or service level specification requirements for the at least part of the service area.

In some example embodiments, the device comprises a Management Data Analytics Services producer at the access network domain.

In some aspects, a method, implemented at a service provider, comprises: collecting knowledge about a plurality of network and management domains including at least a plurality of access network domains; determining service requirements from a service consumer; and selecting, based on the service requirements from the service consumer and the collected knowledge about the plurality of network and management domains, a set of access network domains from the plurality of access network domains to provide a service area for the service consumer.

In some example embodiments, determining the service requirements of the service consumer comprises: receiving a request from a service management device at the service provider to provide the service area for the service consumer, the request comprising the service requirements from the service consumer, and determining, from the request, the service requirements from the service consumer.

In some example embodiments, the method further comprises: for an access network domain of the set of access network domains, determining at least a part of the service area within the access network domain.

In some example embodiments, the method further comprises: determining mapping of the at least part of the service area to a set of tracking areas within the access network domain of the set of access network domains.

In some example embodiments, determining the mapping of the at least part of the service area to the set of tracking areas comprises: sending, to the access network domain of the set of access network domains, a request to provide the set of tracking areas for the at least part of the service area; and receiving, from the access network domain, an indication of the mapping of the at least part of the service area to the set of tracking areas.

In some example embodiments, the method further comprises: obtaining a plurality of tracking areas within the plurality of access network domains; and determining mapping of a registration area to a set of tracking areas of the plurality of tracking areas assigned to the service within at least an access network domain of the set of access network domains based on the service requirements for the service, the collected knowledge about the plurality of network and management domains.

In some example embodiments, the knowledge about the plurality of network and management domains is associated with at least one of a service, service level specification, performance measurements, minimization of drive test data, user equipment mobility, configuration data or network topology.

In some example embodiments, the service requirements from the service consumer are associated with at least one of a geographical area, radio spectrum, an isolation level or reliability of a service.

In some example embodiments, the method is implemented by a Management Data Analytics Service producer at the service provider.

In some aspects, a method, implemented at an access network domain, comprises: collecting knowledge about a plurality of network and management domains including at least the access network domain; determining requirements for at least a part of a service area for a service consumer within the access network domain; and determining, based on the requirements for the at least part of the service area and the collected knowledge about the plurality of network and management domains, mapping of the at least part of the service area to a set of tracking areas within the access network domain.

In some example embodiments, determining the requirements associated for the at least part of a service area comprises: obtaining, from a service provider, a request for mapping of the at least part of the service area to a set of tracking areas, the request comprising the requirements for the at least part of the service area; and determining, based on the request, the requirements for the at least part of the service area.

In some example embodiments, the method further comprises selecting a set of cells from a plurality of cells within the access network domain to provide the at least part of the service area.

In some example embodiments, the method further comprises: determining association between the selected set of cells and the set of tracking areas.

In some example embodiments, the knowledge about the plurality of network and management domains is associated with at least one of a service, service level specification, performance measurements, minimization of drive test data, user equipment mobility, configuration data or network topology.

In some example embodiments, the performance measurements comprise measurements related to tracking area, including measurements associated with at least one of: load utilization of a given tracking area, a number of active or passive user equipment in a cell within a tracking area, or a number of handovers among cells within a tracking area and among cells between neighboring tracking areas.

In some example embodiments, the requirements for the at least part of the service area comprise at least one of coverage requirements or service level specification requirements for the at least part of the service area.

In some example embodiments, the method is implemented by a Management Data Analytics Services producer at the access network domain.

In some aspects, an apparatus, implemented at a service provider, comprises: means for collecting knowledge about a plurality of network and management domains including a plurality of access network domains; means for determining service requirements from a service consumer; and means for selecting, based on the service requirements from the service consumer and the collected knowledge about the plurality of network and management domains, a set of access network domains from the plurality of access network domains to provide a service area for the service consumer.

In some example embodiments, the means for determining the service requirements from the service consumer comprises: means for receiving, from a service management device at the service provider, a request for a list of access network domains to provide the service area for the service consumer, the request comprising the service requirements from the service consumer, and means for determining, from the request, the service requirements from the service consumer.

In some example embodiments, the apparatus further comprises: means for, for an access network domain of the set of access network domains, determining at least a part of the service area within the access network domain.

In some example embodiments, the apparatus further comprises: means for determining mapping of the at least part of the service area to a set of tracking areas within the access network domain of the set of access network domains.

In some example embodiments, the means for determining the mapping of the at least part of the service area to the set of tracking areas comprises: means for sending, to the access network domain of the set of access network domains, a request to provide the set of tracking areas for the at least part of the service area; and means for receiving, from the access network domain, an indication of the mapping of the at least part of the service area to the set of tracking areas.

In some example embodiments, the apparatus further comprises: means for obtaining a plurality of tracking areas within the plurality of access network domains; and means for determining mapping of a registration area to a set of tracking areas of the plurality of tracking areas assigned to the service within at least an access network domain of the set of access network domains based on the service requirements for the service, the collected knowledge about the plurality of network and management domains.

In some example embodiments, the knowledge about the plurality of network and management domains is associated with at least one of a service, service level specification, performance measurements, minimization of drive test data, user equipment mobility, configuration data or network topology.

In some example embodiments, the service requirements from the service consumer are associated with at least one of a geographical area, radio spectrum, an isolation level or reliability of a service.

In some example embodiments, the apparatus is implemented by a Management Data Analytics Service producer at the service provider.

In some aspects, an apparatus, implemented at an access network domain, comprises: means for collecting knowledge about a plurality of network and management domains including at least the access network domain; means for determining requirements for at least a part of a service area for a service consumer within the access network domain; and means for determining, based on the requirements for the at least part of the service area and the collected knowledge about the plurality of network and management domains, mapping of the at least part of the service area to a set of tracking areas within the access network domain.

In some example embodiments, the means for determining the requirements for the at least part of a service area comprises: means for obtaining, from a service provider, a request for mapping of the at least part of the service area to a set of tracking areas, the request comprising the requirements for the at least part of the service area; and means for determining, based on the request, the requirements for the at least part of the service area.

In some example embodiments, the apparatus further comprises means for selecting a set of cells from a plurality of cells within the access network domain to provide the at least part of the service area.

In some example embodiments, the apparatus further comprises: means for determining association between the selected set of cells and the set of tracking areas.

In some example embodiments, the knowledge about the plurality of network and management domains is associated with at least one of a service, service level specification, performance measurements, minimization of drive test data, user equipment mobility, configuration data or network topology.

In some example embodiments, the performance measurements comprise measurements related to tracking area, including measurements associated with at least one of: load utilization of a given tracking area, a number of active or passive user equipment in a cell within a tracking area, or a number of handovers among cells within a tracking area and among cells between neighboring tracking areas.

In some example embodiments, the requirements for the at least part of the service area comprise at least one of coverage requirements or service level specification requirements for the at least part of the service area.

In some example embodiments, the apparatus is implemented by a Management Data Analytics Services producer at the access network domain.

In some aspects, a computer readable storage medium comprises program instructions stored thereon, the instructions, when executed by a processor of a device, causing the device to perform the method according to some example embodiments of the present disclosure.

What is claimed is:

1. A device comprising:

at least one processor; and at least one memory including computer program code;

the at least one memory and the computer program code configured to, with the at least one processor, cause the device to:

collect knowledge about a plurality of network and management domains including at least a plurality of access network domains;

determine service requirements from a service consumer; and select, based on the service requirements from the service consumer and the collected knowledge about the plurality of network and management domains, a set of access network domains from the plurality of access network domains to provide a service area for the service consumer.

2. The device of claim 1, wherein the device is caused to determine the service requirements from the service consumer by:

receiving, from a service management device at a service provider, a request for a list of access network domains to provide the service area for the service consumer, the request comprising the service requirements from the service consumer, and determining, from the request, the service requirements from the service consumer.

3. The device of claim 1, wherein the device is further caused to:

for an access network domain of the set of access network domains, determine at least a part of the service area within the access network domain.

4. The device of claim 3, wherein the device is further caused to:

determine mapping of the at least part of the service area to a set of tracking areas within the access network domain of the set of access network domains.

5. The device of claim 4, wherein the device is caused to determine the mapping of the at least part of the service area to the set of tracking areas by:

sending, to the access network domain of the set of access network domains, a request to provide the set of tracking areas for the at least part of the service area; and receiving, from the access network domain, an indication of the mapping of the at least part of the service area to the set of tracking areas.

6. The device of claim 1, wherein the device is further caused to:

obtain a plurality of tracking areas within the plurality of access network domains; and determine mapping of a registration area to a set of tracking areas of the plurality of tracking areas assigned to the service within at least an access network domain of the set of access network domains based on the service requirements from the service consumer, the collected knowledge about the plurality of network and management domains.

7. The device of claim 1, wherein the knowledge about the plurality of network and management domains is associated with at least one of a service, service level specification, performance measurements, minimization of drive test data, user equipment mobility, configuration data or network topology.

8. The device of claim 1, wherein the service requirements from the service consumer are associated with at least one of a geographical area, radio spectrum, an isolation level or reliability of a service.

9. The device of claim 1, wherein the device comprises a Management Data Analytics Service producer at a service provider.

10. A method implemented at a service provider, comprising:

collecting knowledge about a plurality of network and management domains including at least a plurality of access network domains;

determining service requirements from a service consumer; and selecting, based on the service requirements from the service consumer and the collected knowledge about the plurality of network and management domains, a set of access network domains from the plurality of access network domains to provide a service area for the service consumer.

11. The method of claim 10, wherein determining the service requirements from the service consumer comprises:

receiving, from a service management device at the service provider, a request for a list of access network domains to provide the service area for the service consumer, the request comprising the service requirements from the service consumer, and determining, from the request, the service requirements from the service consumer.

12. The method of claim 10, further comprising:

for an access network domain of the set of access network domains, determining at least a part of the service area within the access network domain, determining mapping of the at least part of the service area to a set of tracking areas within the access network domain of the set of access network domains.

13. The method of claim 12, wherein determining the mapping of the at least part of the service area to the set of tracking areas comprises:

sending, to the access network domain of the set of access network domains, a request to provide the set of tracking areas for the at least part of the service area; and receiving, from the access network domain, an indication of the mapping of the at least part of the service area to the set of tracking areas.

14. The method of claim 10, further comprising:

obtaining a plurality of tracking areas within the plurality of access network domains; and determining mapping of a registration area to a set of tracking areas of the plurality of tracking areas assigned to the service within at least an access network domain of the set of access network domains based on the service requirements for the service, the collected knowledge about the plurality of network and management domains.

15. The method of claim 10, wherein the knowledge about the plurality of network and management domains is associated with at least one of a service, service level specification, performance measurements, minimization of drive test data, user equipment mobility, configuration data or network topology.

16. The method of claim 10, wherein the service requirements from the service consumer are associated with at least one of a geographical area, radio spectrum, an isolation level or reliability of a service.

17. The method of claim 10, wherein the method is implemented by a Management Data Analytics Service producer at the service provider.

18. A non-transitory computer readable medium implemented at an access network domain, comprising instructions stored thereon, that when executed by a processor, performs the steps of:

collecting knowledge about a plurality of network and management domains including at least the access network domain;

determining requirements for at least a part of a service area for a service consumer within the access network domain; and determining, based on the requirements for the at least part of the service area and the collected knowledge about the plurality of network and management domains, mapping of the at least part of the service area to a set of tracking areas within the access network domain.

* * * * *